United States Patent Office 3,823,234
Patented July 9, 1974

3,823,234
MONOHYDRATED PAPAVERINE ADENOSINE-5'-MONOPHOSPHATE MEDICAMENT FOR TREATMENT OF CARDIOVASCULAR DISORDERS
Roland Yves Mauvernay, Riom, France, assignor to Centre Europeen de Recherches Mauvernay C.E.R.M., Riom, France
No Drawing. Filed Mar. 9, 1972, Ser. No. 233,298
Claims priority, application France, Mar. 16, 1971, 7109044
Int. Cl. A61k 27/00
U.S. Cl. 424—180
9 Claims

ABSTRACT OF THE DISCLOSURE

As a medicament for treating cardiovascular disorders there is provided as the active substance, monohydrated papaverine adenosine-5'-monophosphate. The active substance is particularly suitable for the treatment of various disorders due to circulatory insufficiency of cerebal, peripheral or coronary localization.

FIELD OF INVENTION

The present invention relates to a novel medicament and, more particularly, to a novel derivative of adenosine and its use as a medicament or pharmaceutical for the treatment of various cardiovascular disorders in human and/or veterinary therapy.

BACKGROUND OF INVENTION

Adenosine-5'-monophosphoric acid, also known as 5'-adenylic acid or AMP, has been actively studied and its activity on the blood platelets, on enzymes, on the isolated uterus, on the isolated intestine, on the oxygenation of the brain after cerebral infarction or in cerebral arteriosclerosis and on the contractility of strongly vascularized muscles such as the heart has been determined. Similarly, the activity of papaverine in the same areas has also been studied and described. It has been determined that the activity of papaverine, from certain points of view, is fairly close to the activity of AMP and/or it is of a nature for usefully completing or compensating for the activity of AMP.

It has been suggested that adenosine and the phosphonucleotides of adenine be used to provide a vasocilatory effect on the coronary vessels, administration thereof being effected by intravenous route. It is also known that papaverine inhibits the fixation of the adenosine (nucleoside from which the AMP is derived by phosphorylation) by the blood platelets, while at the same time potentializing its inhibiting effect on the agglutination of such platelets. In this respect, papaverine thus has a tendency to reinforce the anti-thrombic action of the adenosine. It has also been suggested that papaverine inhibits the penetration of the adenosine into the erythrocytes and its degradation by the adenosine diaminasis within these erythrocytes. From this determination, it has been suggested that the coronary dilating action of the papaverine would be found to be reinforced by the resultant accumulation of circulating AMP.

Nevertheless, the effects inherent in each of these two compounds have always been considered separately; and, insofar as is known, their joint effect in combination has not been studied.

The pharmacological activity of papaverine at the cardiac level has been explained by the fact that papaverine lowers the oxidative phosphorylation at the level of the mitochondria and that any breaking action of the oxidative phosphorylation is shown by an increase in metabolic processes. It may be assumed that this inhibiting activity of papaverine is shown by an activation of the adenosine triphosphatase, with acceleration of the transformation of the AMP present into adenosine triphosphate, or ATP, with raising of the energy balance.

Papaverine is a compound almost completely insoluble in water and, for this reason, it is normally administered in the form of its hydrochloride. In this form it has been used essentially as a spasmolytic for alleviating the contracture of the unstriated muscular fibers.

The other papaverine salts presently known are the hydrobromide, the hydroiodide, the methyliodide, the acid sulphate, the acid oxalate, the succinate, the salicylate, the picrate and the picrolonate, all of which have the same therapeutic utility as the hydrochloride; also known is the nitrite, which has been suggested for use in alleviating buzzing in the ears. All such salts, however, such as the hydrochloride, are always subject to a very rapid hydrolysis, and this results in great pain during the injection and, with weak solubility, such compounds are too slowly resorbed.

The known applications of AMP are essentially those of adenine, due to the fact that it causes, like adenine, the dilation of the coronary vessels, bradycardia, hypotension and leucocytosis.

Accordingly, from the above discussion of the prior art it is seen that both papaverine and AMP have provided some difficulties in their utilization, including rapid hydrolysis, painful injection, low solubility and less than entirely satisfactory clinical effects.

SUMMARY

It is, accordingly, an object of the present invention to overcome the defects in the prior art, such as indicated above.

It is another object of the present invention to provide for improved treatment of various cardiovascular disorders and diseases.

It is another object of the present invention to provide a new and improved cardiovascular medicament.

It is another object of the present invention to provide a new papaverine salt having improved utility, and particularly having better solubility in water, better stability and improved pharmacological properties.

These and other objects and the nature and advantages of the instant invention will be more apparent from the following description. In general, however, there is provided in accordance with the present invention a novel cardiovascular medicament characterized in that it comprises, as the active substance, monohydrated papaverine adenosine-5'-monophosphate.

For a better understanding of the invention, possible embodiments thereof will now be described, it being understood that such embodiments are intended as being merely exemplary, and in no way limitative.

DETAILED DESCRIPTION

It has been discovered, in accordance with the present invention, that an adenosine - 5' - monophosphoric acid (or 5'-adenylic acid, or AMP) can be easily combined with the papaverine base in order to form a new acid addition salt, which is a well-defined chemical entity, papaverine adenosine - 5' - monophosphate. Independent of the surprising therapeutic activity which this compound is found to possess, it also has the advantage over the papaverine hydrochloride and other salts of having better solubility in water and, in particular, having a much better stability. It has also been discovered that this novel compound has interesting pharmacological properties which make it a valuable medicament for the treatment of disorders due to circulatory, cerebral, peripheral or coronary insufficiency or for cardiovascular protection.

The novel medicament according to the present invention possesses, to a much higher degree than a simple pluralism or combination of the two separate compounds would expect to have, the advantageous characteristics of each of the compounds, AMP and papaverine, from which it is obtained by combination, while it is to the contrary, free from the disadvantages of these same compounds and particularly free from the disadvantages of papaverine. For example, monohydrated papaverine adenosine-5'-monophosphate is found to produce an increase in the coronary flow and in the oxygen content of the coronary venal blood, which is much greater than that of papaverine. On the other hand, it is bradycardial whereas papaverine is slightly tachycardial, and it increases cardiacal work to a lesser degree than does papaverine. Papaverine adenosine - 5' - monophosphate also has the advantage over AMP of not causing any mild cardial depression.

Papaverine adenosine - 5' - monophosphate can be prepared very simply:

In general, it is necessary only to mix the known materials monohydrated adenosine - 5' - mono-phosphoric acid and papaverine in roughly equimolar quantities and gently heat the mixture until the reaction therebetween is complete.

For example:

To 3.65 g. (0.01 mole) of monohydrated adenosine-5'-monophosphoric acid, brought into suspension in a mixture of 45 ml. of water and 5 ml. of ethanol, are added 3.39 g. (0.01 mole) of papaverine base (M.P.=147° C.). The mixture is gently heated until a final temperature of 40° C. is reached. The solution obtained is then filtered and the filtrate is concentrated under vacuum. The remaining product quickly crystallizes. After drying at 50° C. to constant weight, there are obtained 6.68 g. of desired product, in the monohydrated state, as a white crystalline powder, which melts at 140° C. and is very soluble in water.

Analysis of this compound, with the empirical formula $C_{30}H_{35}N_6O_{11}P \cdot H_2O$ and with a molecular weight of 704.64, provides the following results:

|  | Percent | | |
| --- | --- | --- | --- |
|  | C | H | N |
| Calculated | 51.13 | 5.29 | 11.92 |
| Found | 50.60 | 5.31 | 11.75 |

Pharmacodynamic properties

Investigation of the pharmacodynamic properties of the papaverine adenosine - 5' - monophosphate was carried out on the basis of the three following tests:

(1) Arterial pressure in the chloralose treated dog, with a closed thorax;
(2) Arterial pressure in the amyelated and bilaterally vagotomized rat;
(3) Femoral rate of flow in the chloralose treated dog.

Each of these three tests were also carried out, for purposes of comparison, after administration of papaverine alone or AMP alone, either in equimolar doses or in doses equal by weight.

I. ARTERIAL PRESSURE IN THE AN-AESTHESIZED DOG

After having been anaesthesized with chloralose, by intravenous injection at a dosage of 80 mg./kg., a carotid is isolated and catheterized. The catheter is connected to a mercury pressure gauge. The continuous recording of the arterial pressure is effected by kymography. The active agents or medicaments, at equal molar dosage, were then utilized. The following table indicates the averages of the percentages of hypotensive activity reduction and the averages of the periods of action.

TABLE I

| Medicament | Dose, mg./kg. | Average of hypotension reduction (percent) | Average of the period of action, min. |
| --- | --- | --- | --- |
| Papaverine adenosine-5'-monophosphate | 4 | −65%±10 | 30 |
| Papaverine | 2 | −47%±6 | 5 |
| AMP | 2 | −27%±3 | 2 |

The activity of the medicament in accordance with the invention is thus obviously better than that of either one of the compounds used as initial materials for its preparation and considered from their most favorable point of view. This superiority resides at the same time in the percentage of maximum effect and in the period of action; this increased period of activity indicates that the medicament according to the invention exerts a vasodilating effect which is particularly sustained at the periphery.

II. ARTERIAL PRESSURE IN THE AMYELATED AND BILATERALLY VAGOTIMIZED RAT

After anaesthesia with sodium 5-ethyl - 5 - (1-methylbutyl)barbiturate (Nembutal), administered intraperitoneally in the dose of 34 mg./kg. the spinal cord is destroyed, using the Shipley and Tilden method (cf. Proceedings of the Society for Exp. Biol. and Med. (1947), vol. 64).

Each of the three medicaments under examination is injected intravenously into the juglar vein, in a substantially equimolar dosage as compared with that of each of the two others.

The results, expressed as a mean percentage of hypotensive activity reduction and of the period of action, are set out in the following table:

TABLE II

| Medicament | Dose, mg./kg. | Average of hypotensive activity reduction (percent) | Average of the length of action, min. |
| --- | --- | --- | --- |
| Papaverine adenosine-5'-monophosphate | 4 | −46%±6 | 15 |
| Papaverine | 2 | −25%±6 | 3 |
| AMP | 2 | −38%±9 | 5 |

This method very clearly shows the peripheral vasodilatating activity of the medicament according to the present invention. It is seen from the above Table II that this activity is always better than that of each of the products used as initial materials and especially that the length of action is decidedly longer.

III. FEMORAL VENAL RATE OF FLOW IN THE DOG

After being anaesthetized with chloralose, each of the aforesaid medicaments are administered intra-arterially in a substantially equimolar dosage as compared with that of each of the two others, namely:

Mg./kg.
Papaverine adenosine-5'-monophosphate _____ 1
Papaverine _____ 0.5
AMP _____ 0.5

In the following Table III, the comparison of the activity of the novel medicament (PA5'MP) with that of papaverine and, respectively, with that of AMP, is effected by providing, in percentage, the ratio of the augmentation of femoral venal flow by the use of PA5'MP compared with that of papaverine and AMP, respectively.

TABLE III

| Relative values | | | |
|---|---|---|---|
| Papaverine | | AMP | |
| Percent of increase of augmentation using PA5'MP | Percent of increase of augmentation at the planimetric value for PA5'MP* | Percent of increase of augmentation using PA5'MP | Percent of increase of augmentation at the planimetric value for PA5'MP* |
| 139±15 | 164±33 | 135±13 | 147±25 |

*The planimetric value is the activity measured over a time during which the activity is constant.

The same series of experiments is repeated, but with doses equal in weight, of 0.5 mg./kg. for each of the three medicaments, and the results are translated in accordance with the same arbitrary standards, thereby obtaining:

TABLE III

| Relative values | | | |
|---|---|---|---|
| Papaverine | | AMP | |
| Percent of increase of augmentation using PA5'MP | Percent of increase of augmentation at the planimetric value for PA5'MP* | Percent of increase of augmentation using PA5'MP | Percent of increase, of augmentation at the planimetric value for PA5'MP |
| 133.5±17 | 128.5±14 | 96±18 | 108±15 |

Here again, it is observed that there is a decided superiority in activity of the medicament according to the present invention, both in maximum value of activity and in planimetric value.

Therapeutic indications

The first clinical tests undertaken with the medicament according to the invention justify its main therapeutic indications: circulatory insufficiencies with cerebral localization (cerebral infarction, arteriosclerosis), peripheral or coronary localization, cardiovascular protection.

Preferred pharmaceutical forms

The therapeutic agent in accordance with the present invention, PA5'MP, is preferably utilized in the form of an intravenous injectable solute in suitable solvent, or in the form of capsules, tablets, drops or suppositories, using any pharmaceutically acceptable excipient or coating agents. Among those excipients commonly used for liquid preparations are water, ethanol, and other pharmaceutically acceptable liquids. Among those excipients normally used for solid preparations, such as capsules and tablets, are carboxymethylcellulose, methylcellulose, various sugars such as maltose, sucrose and lactose, fillers such as magnesium carbonate, cornstarch and other starches, talc, lubricants such as magnesium stearate, stearic acid, polyoxyethylene stearate, and other excipients including sodium alginate, glycerine, vegetable oils, waxes, fats, etc. Among those excipients normally used for suppositories are glycerin, triglyceride of fatty acids, etc.

An example of a pharmaceutical preparation, a sugar coated tablet, is as follows:

| | Mg. |
|---|---|
| Papaverine adenosine-5'-monophosphate monohydrate | 100 |
| Cornstarch | 53 |
| Micronized cellulose | 37 |
| Polyvinylpyrrolidone | 2 |
| Methyl cellulose | 5 |
| Stearic acid | 1 |
| Talc | 2 |

The pharmaceutical compositions may be prepared following the conventional techniques in the field. The above noted sugar coated tablet is formed as follows:

Sieve and mix papaverine adenosine-5'-monophosphate monohydrate, cornstarch and micronized cellulose. Wet with a solution of polyvinylpyrrolidone and methyl cellulose in 96% alcohol. Granulate on sieve (no. 32 AFNOR). Dry at 40° C. Add stearic acid and talc. Gauge on No. 31 sieve (AFNOR). Compress and coat with the sugar.

Posology

The recommended daily doses for humans are, on the average, as follows:

perorally: 0.5 g. to 1.5 g.
parenterally (i.v.): 50 mg. to 500 mg.
rectally: 0.5 g. to 1.5 g.

The quantity of each dose and the number of dosages per day can be varied within the recommended daily doses indicated above.

It is to be understood that the invention is not limited to the embodiments disclosed above which are illustratively offered, and that modification can be made without departing from the invention.

What is claimed is:

1. A therapeutic comprising: as the primary active ingredient, 50 mg. to 1.5 grams of papaverine adenosine-5'-monophosphate; dispersed in a pharmaceutical carrier.

2. A process for dilating blood vessels, reducing hypotension, improving blood flow and oxygenation and reducing spasms, which comprises administering in an amount sufficient to accomplish the above objectives, papaverine adenosine-5'-monophosphate.

3. A process in accordance with claim 2 wherein said papaverine adenosine-5'-monophosphate is administered at a daily dose of at least 50 mg.

4. A process in accordance with claim 2 wherein said papaverine adenosine-5'-monophosphate is administered per orally at a daily dosage of at least 50 mg.

5. A process in accordance with claim 4, wherein aid daily dosage is up to 1.5 g. of papaverine adenosine-5'-monophosphate.

6. A process in accordance with claim 2 wherein aid papaverine adenosine-5'-monophosphate is administered intraveneously at a daily dosage of at least 50 mg.

7. A process in accordance with claim 6, wherein said daily dosage is up to 500 mg. of papaverine adenosine-5'-monophosphate.

8. A process in accordance with claim 2 wherein said papaverine adenosine-5'-monophosphate is administered rectally at a daily dosage of at least 50 mg.

9. A process in accordance with claim 8, wherein said daily dosage is up to 1.5 g. of papaverine adenosine-5'-monophosphate.

References Cited

UNITED STATES PATENTS

| | | | |
|---|---|---|---|
| 2,089,227 | 8/1937 | Ruskin | 260—211.5 R |
| 3,127,316 | 3/1964 | Ruskin | 260—211.5 R |
| 3,174,963 | 3/1965 | Farhi | 260—211.5 R |
| 2,417,841 | 3/1947 | Ruskin | 260—211.5 R |
| 2,407,686 | 9/1946 | Ruskin | 260—211.5 R |
| 2,710,860 | 6/1955 | Ruskin | 260—211.5 R |
| 2,712,541 | 7/1955 | Ruskin | 260—211.5 R |

OTHER REFERENCES

Chem. abstracts 74, #139054s, #11679g, #611y, 74642k, #74643m (1971).
Chem. abstracts 73, #73246b, #97076x.
Chem. abstracts 72, #53417j, #41325q (1970).
Chem. abstracts 71, #10086s, #1863m (1969).

SHEP K. ROSE, Primary Examiner

U.S. Cl. X.R.

260—211.5 R; 424—260

UNITED STATES PATENT OFFICE
CERTIFICATE OF CORRECTION

Patent No. 3,823,234  Dated July 9, 1974

Inventor(s) Roland Yves MAUVERNAY

It is certified that error appears in the above-identified patent and that said Letters Patent are hereby corrected as shown below:

Col. 5, line 17, delete "TABLE III" and insert therefor --TABLE IV--;

Col. 5, line 56, delete "triglyceride" and insert therefor -- triglycerides -- .

Col. 6, line 35, delete "aid" and insert therefor --said--;

Col. 6, line 39, delete "aid" and insert therefor --said--;

Col. 6, line 67, delete "10086s" and insert therefor --100086s--.

Signed and sealed this 8th day of October 1974.

(SEAL)
Attest:

McCOY M. GIBSON JR.
Attesting Officer

C. MARSHALL DANN
Commissioner of Patents